United States Patent [19]

Erickson

[11] Patent Number: 5,058,311

[45] Date of Patent: Oct. 22, 1991

[54] METHOD FOR DESTROYING BURROWING ANIMALS

[76] Inventor: Erik E. Erickson, 1020 33rd Ave., NE., Olympia, Wash. 98506

[21] Appl. No.: 616,797

[22] Filed: Nov. 21, 1990

[51] Int. Cl.$^5$ .............................................. A01M 23/00
[52] U.S. Cl. ........................................ 43/58; 43/60; 43/124
[58] Field of Search ................. 43/58, 60, 85, 87, 90, 43/124, 125, 131, 132

[56] References Cited

U.S. PATENT DOCUMENTS

| | | | |
|---|---|---|---|
| 791,933 | 6/1905 | McEndree | 43/60 |
| 1,492,732 | 5/1924 | Knopf | 43/124 |
| 1,573,670 | 2/1926 | Barnes | 43/124 |
| 4,413,440 | 11/1983 | Schultz | 43/124 |
| 4,449,316 | 5/1984 | Moorhead | 43/58 |
| 4,841,668 | 6/1989 | McKenzie | 43/124 |

*Primary Examiner*—Richard K. Seidel
*Assistant Examiner*—Chuck Y. Mah
*Attorney, Agent, or Firm*—Brian J. Coyne

[57] ABSTRACT

A method is described for destroying moles, voles, gophers and other underground tunnelling animals. The point of joinder of an exit passageway from a tunnel is located. The soil overlying an adjacent portion of tunnel is removed. Netting, preferably plastic netting with grid dimensions one-half by five-eighths inch, is laid on the bottom surface of the exposed portion of tunnel. Soil is loosely packed over the netting to encourage burrowing animals to use the tunnel and become entangled in the netting.

5 Claims, No Drawings

METHOD FOR DESTROYING BURROWING ANIMALS

BACKGROUND OF THE INVENTION

This invention relates to a method of destroying burrowing animals. Burrowing animals, such as moles, voles and gophers, tunnel underground, thereby creating holes and mounds in the surface of the ground. Such holes and mounds are unsightly, particularly in lawns and gardens. They are also impediments to travel by foot as they can result in ankle sprains and other injuries.

Past attempts to control these pests included injection of poison into their tunnels, such as strychnine or poisoned grain. See, for example, H. D. Schultz (U.S. Pat. No. 4,413,440, issued Nov. 8, 1983), and C. O. McKenzie (U.S. Pat. No. 4,841,668, issued Jun. 27, 1989), and introduction of noxious gases into the tunnels. Poisons and noxious gases, however, create only a temporary hazard to burrowing animals because they rapidly lose potency through dilution and degradation.

It is therefore an object of this invention to provide a new method for destroying burrowing animals such as moles, voles and gophers.

It is another object of this invention to provide a method for destroying burrowing animals that creates a permanent hazard to burrowing animals

SUMMARY OF THE INVENTION

This is a method of destroying underground tunnelling animals, such as moles, voles and gophers, that move in underground tunnels. A hill or mound created by a burrowing animal is identified. The mound is pushed aside, and the underlying area is probed to determine the location and direction of an exit passageway from an underground tunnel. The exit passageway is then followed to locate its point of joinder with a tunnel. The soil overlying the tunnel is removed and netting is laid on the floor of the exposed tunnel. The exposed tunnel is then covered over with loose soil to encourage burrowing animals to continue to use the tunnel whereby they become entangled in the netting.

DETAILED DESCRIPTION OF THE INVENTION

The presence of burrowing animals is usually indicated by mounds of soil accumulated from their underground tunneling. Although the tunnels run more or less horizontally underground, the animals dig exit passageways from the tunnels angularly upwards to ground surface. The soil in a mound is pushed aside, and the soil is probed with fingers or a stick to determine the direction of an exit passageway from a tunnel. The exit passageway is followed down to its point of joinder with a tunnel. The soil overlying the point of joinder is removed, e.g., with a shovel, to expose the point of joinder and an adjacent portion of the tunnel. The earth overlying an adjacent portion of the tunnel is cleared away for a distance of eighteen inches, more or less, from the point of joinder. A sheet of netting having dimensions preferably six inches by eighteen inches, more or less, is laid along the exposed bottom surface of the tunnel. Preferably, each end of the netting is folded upwards to create a vertical obstruction to passage of an animal through the tunnel. The netting is preferably made from plastic in a rectangular grid having grid dimensions of one-half inch by five-eighths inch, more or less, but larger or smaller grid dimensions may also be used. The soil that was removed from the tunnel is placed back into the tunnel, thereby covering the netting. The soil is loosely packed in order to encourage burrowing animals to use the tunnel and become trapped in the netting. This procedure is then repeated for each of the tunnels that may be located in the area in which it is desired to eliminate burrowing animals.

From my observations, after placing netting into a tunnel and afterwards digging up the same tunnel, the netting has been removed, indicating that an underground tunnelling animal had become entangled in the netting and had carried it off to some other location, presumably starving and dying as a result. This method has been effective in eliminating moles, voles and gophers from an area treated as described herein.

The foregoing is considered illustrative only of the principles of my invention. Accordingly, all suitable modifications and equivalents may be resorted to, falling within the scope of my invention.

I claim:

1. A method for destroying underground tunnelling animals such as moles, voles and gophers, including the steps of:
   a. locating the point of joinder of an exit passageway from a tunnel and an adjacent portion of the tunnel;
   b. removing the soil overlying the point of joinder and from an adjacent portion of the tunnel thereby exposing the bottom surface of the tunnel;
   c. laying netting along the bottom surface of the tunnel; and
   d. covering the exposed portion of the tunnel with loosely packed soil in order to encourage burrowing animals to move through the tunnel and become entangled in the netting.

2. The method of claim 1 wherein the netting is substantially rectangular the ends of the netting are folded upwards to create vertical obstructions to passage of an animal through the tunnel.

3. The method of claim 1 wherein the netting is made from plastic.

4. The method of claim 1 wherein the netting has grid dimensions approximately one-half inch by five-eighths inch.

5. The method of claim 1, 2, 3, or 4 wherein the exposed portion of tunnel is approximately eighteen inches long, and the netting has dimensions approximately eighteen inches long by six inches wide.

* * * * *